United States Patent Office 3,274,781
Patented Sept. 27, 1966

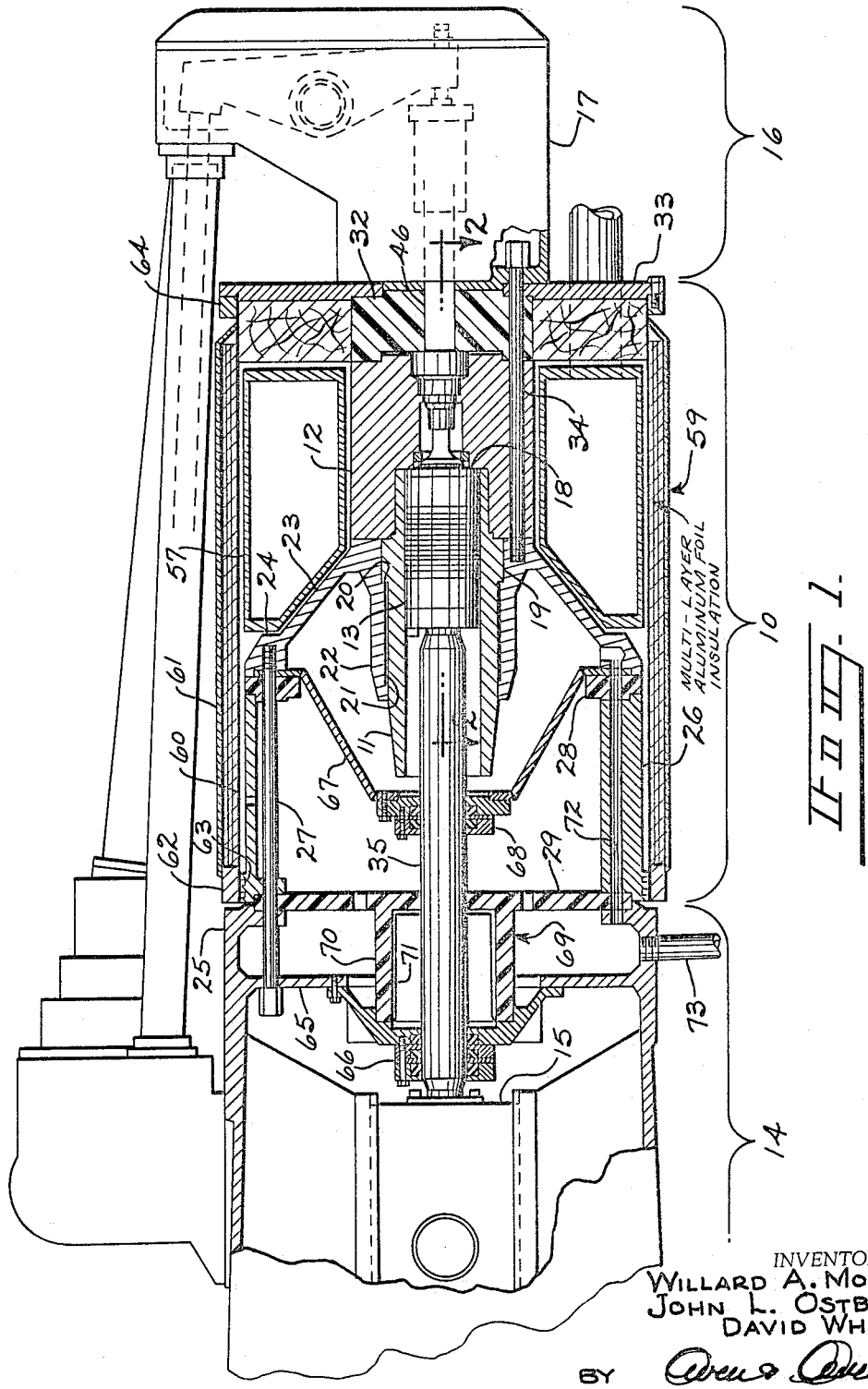

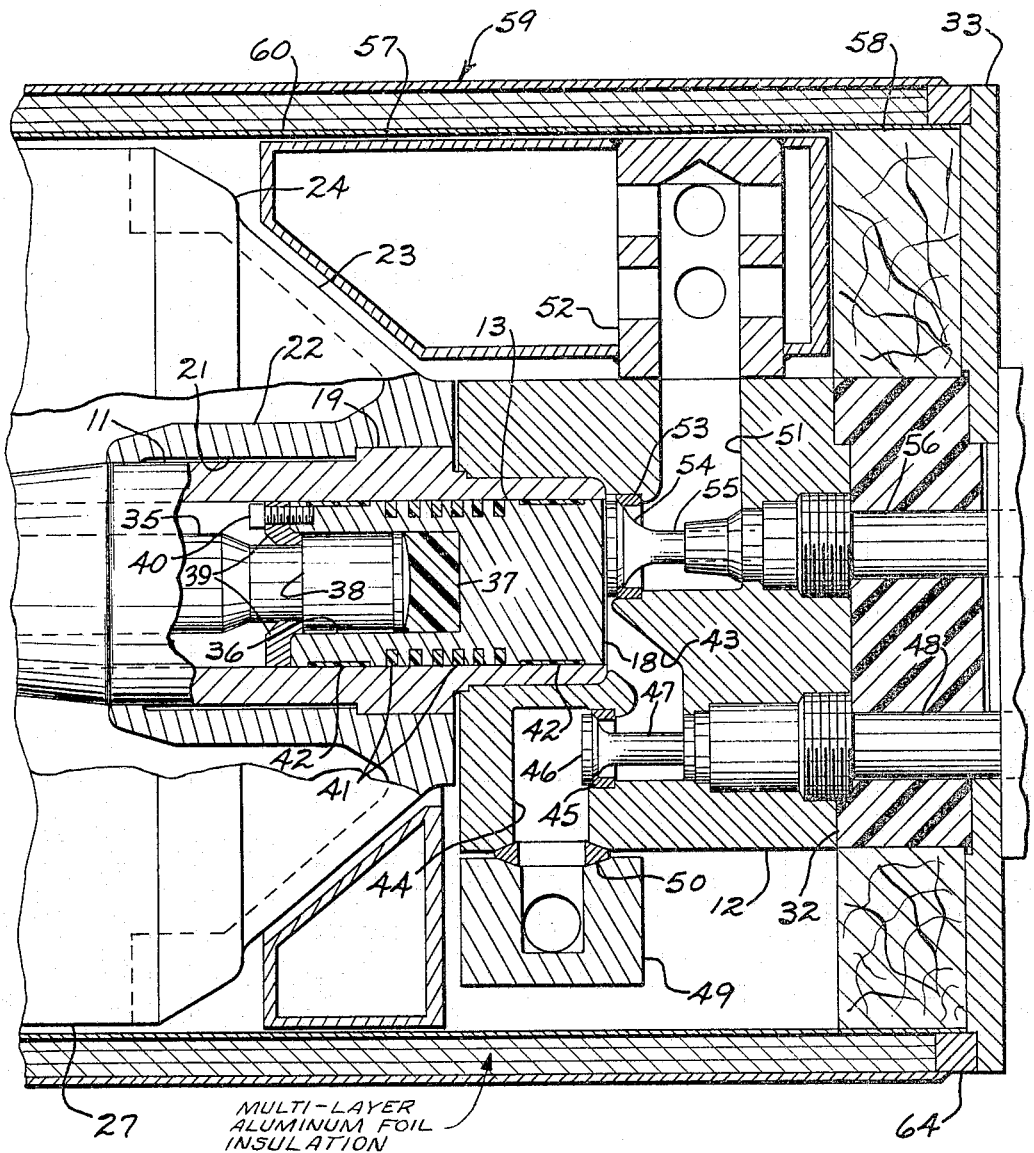

3,274,781
CRYOGENIC EXPANSION ENGINE
Willard A. Morain, Mount Vernon, John L. Ostborg, Springfield, and David White, Columbus, Ohio, assignors to The Cooper-Bessemer Corporation, Mount Vernon, Ohio, a corporation of Ohio
Filed June 17, 1963, Ser. No. 288,235
20 Claims. (Cl. 60—64)

The present invention relates to expansion engines for use in refrigeration processes; and more particularly to expansion engines which operate at temperatures in the cryogenic range.

In the ordinary refrigeration system, such as is used in household refrigerators and the like, gases under pressure are expanded through throttling devices such as a valve. Expansion through a throttling device is a constant enthalpy process and would not produce an appreciable reduction in temperature if the refrigerant used was an ideal gas. The refrigerants which are used are not, however, ideal gases and to the extent that they deviate from an ideal gas, they produce a drop in temperature during the throttling process.

A more efficient refrigeration process is obtained by expanding the refrigerant in a device which extracts work from the gases as they are expanding. The energy which is removed from the gases by reason of the work performed during their expanding operation produces a drop in temperature of the refrigerant. Such processes are constant entropy processes. The devices used for extracting work from expanding gases may be termed expansion engines and they involve structures which are considerably more complex and costly than the commonly used throttling devices.

The lighter gases such as methane, oxygen, argon, fluorine, nitrogen, neon, hydrogen, and helium, when at atmospheric pressure can be liquified only by cooling them to extremely low temperatures. Each of the above gases liquefies at a specific temperature at atmospheric pressure—methane, for example, liquefies at approximately −260° F. and helium liquefies at a temperature of approximately −430° F. The temperature range from approximately −250° F. down to −459.6° F. (absolute zero) is usually referred to as the cryogenic temperature range, and expansion engines which operate in this temperature range are called cryogenic expansion engines. In these engines, gas that has been previously compressed to a high pressure, such as 3,000 p.s.i., and cooled to a suitably low inlet temperature, is admitted into an expansion cylinder and work extracted therefrom while the gas pressure is greatly reduced to about for example, 100 p.s.i. This drop in pressure, accompanied by energy extraction reduces the temperature of the gas to just above the liquefication ranges.

Numerous problems are involved in the construction and operation of expansion engines which operate in the cryogenic temperature range. Lubrication, for example, is an extremely difficult problem, inasmuch as conventional lubricants solidify at the temperatures involved. In one type of prior art engine, therefore, the cylinder walls of the expansion engine are heated in order that a conventional lubricant can be used to lubricate its reciprocating piston. The heating of the cylinder walls will, of course, transfer some heat to the gases being cooled by the expansion engine to cause a reduction in efficiency of the operation of the machine. In addition, the use of a hydrocarbon lubricant on the cylinder walls of the reciprocating expansion engine causes a certain amount of the hydrocarbon to be entrained in the gases being cooled, to produce a contaminant which in most instances must be removed from the discharge gases of the machine. The removal of these contaminants represents a difficult problem; and what is more, hydrocarbon contaminants create a severe explosion hazard when incorporated in gases such as oxygen and fluorine.

In most prior art cryogenic expansion engines with which we are familiar, the valve actuating mechanism for the inlet and outlet valves for the expansion cylinder is connected directly to the cold cylinder head, and the valve actuating mechanism is therefore enclosed within an insulating jacket which surrounds the cold portions of the machine. In such instances, a conventional lubricant cannot be used for the valve actuating mechanism that is contained within the insulating jacket, and a considerable amount of valve malfunction has been experienced.

The reciprocatory movement of the piston of a positive displacement cryogenic expansion engine is transmitted by means of a piston rod to a conventional cross head and cooperating crank structure for converting the linear motion of the piston to rotary motion. The cross head and crank structure is maintained at ambient conditions of temperature and pressure and is oil lubricated, and an oil seal is provided around the piston rod for preventing oil from the lubricated structure from flowing along the rod to the piston and expansion cylinder. In prior art installations with which we are familiar, frost collects on the piston rod and oil seal to make this oil seal inoperative and thereby allow oil to enter the cold region adjacent the cylinder chamber.

An object of the present invention is the provision of a new and improved reciprocating cryogenic expansion engine in which the reciprocating piston and cooperating cylinder and cylinder head are substantially thermally isolated from both the structure which transforms the reciprocating movement into rotary motion, and the structure which actuates the inlet and outlet valves. By reason of this arrangement, conventional oil-lubricated and trouble-free structures can be used both for converting the reciprocatory movement of the piston to rotary motion, and for actuating the inlet and outlet valves for the expansion chamber.

In prior art cryogenic reciprocating expansion engines, the exhaust valve for the cylinder is kept open for substantially the full discharge stroke of the piston to discharge substantially all of the cold expanded gases from the cylinder. In these prior art expansion engines, the exhaust valve closes at the very end of the discharge stroke so that substantially no increase in pressure is created in the cylinder chamber at the time that the inlet valve opens. Since the inlet valve opens outwardly into a pipe or chamber containing highly compressed gas, at, for example, 3,000 p.s.i., large forces are exerted on the inlet valve and its actuating structure, and the sudden rush of these high-pressure gases into the cylinder upon opening of the inlet valve produces a pounding action on the piston.

Another object of the present invention, therefore, is the provision of an improved expansion engine cycle wherein a definite recompression of the gases is produced at the end of the exhaust stroke to reduce the mechanical force registered to open the intake valve, to reduce the surge of pressure against the piston structure, and at the same time improved the thermal efficiency of the engine.

Another object of the invention is the provision of new and improved means for thermally insulating the housing of the piston chamber from the crankcase of the expansion engine.

A further object is the provision of new and improved means for utilizing the piston blow-by gases for effectively insulating the cylinder chamber.

A further object is the provision of new and improved means for preventing frost from collecting on the piston rod and crankcase oil seal.

A still further object of the invention is the provision of an annular surge tank for the exhaust gases of the expansion engine, which tank is positioned around at least a portion of the cylinder, and/or cylinder head, and is housed within the same radiation shield that is used for insulating the cylinder.

Other objects and advantages of the invention will become apparent from the following description of the preferred embodiment thereof, reference being had to the accompanying drawings forming a part of this specification, and in which:

FIG. 1 is a fragmentary sectional view of a cryogenic expansion engine embodying the present invention; and FIG. 2 is a fragmentary sectional view taken approximately on the line 2—2 of FIG. 1.

The cryogenic expansion engine shown in the drawing generally comprises a center heat insulated section 10 which includes a cylinder barrel 11, cylinder head 12 and piston 13 and a conventional crankcase section 14 which includes a guided crosshead 15 and a crankshaft (not shown) for changing reciprocatory motion of the crosshead and piston 13 to rotary motion. A conventional overhead valve actuating section 16 is provided and is housed in a rocker box 17 secured to the opposite end of the center section 10 from the crankcase section 14. The crankcase section 14 and valve actuating section 16 are maintained at approximately ambient conditions and are oil lubricated so that both sections provide long and trouble-free operation.

The cylinder barrel 11 forms the sidewalls of the cylinder chamber 18 in which the piston 13 is slidably received, and the cylinder barrel 11 is held in place by a small flange 19 that is confined between the cylinder head 12 and a shoulder 20 formed in a central opening 21 of an annular cylinder housing 22. The cylinder housing 22 is provided with a generally radially extending flange 23 whose radial outer edge is thickened as at 24. The section 24 is generally the same diameter as the outer periphery of the crankcase housing 25 and the section 24 is spaced from the crankcase by an annular spacer section 26 that is positioned therebetween. The cylinder housing 22 is secured to the crankcase housing by stainless steel studs 27 which are threaded into the thickened section 24. The spacer section 26 serves the purpose of providing a long path through which heat must be conducted from the crankcase housing 25 before it can enter the cylinder housing 22. To further increase the resistance to heat flow through the spacer section 26, an annular ring of insulating material 28 is positioned between the spacer section 26 and flange 24, and a disc of insulating material 29 is provided between the crankcase housing 25 and the spacer section 26. The insulating material must be capable of taking the bolt load from the studs without permanent deformation, and it has been found that a glass fiber filled polyester plastic material has all of the necessary properties for use in these locations.

The rocket box 17 is insulated from the cylinder head 12 by a thick section 32 of insulating material which preferably is of the same material as the ring 28 and disc 29. An annular end plate 33 is positioned between the section 32 of insulating material and the rocker box 17. The rocker box 17, insulation 32, and cylinder head 12 are clamped in place by stainless steel studs 34 which are threaded into the cylinder housing 22.

Inasmuch as the cylinder housing 22 is spaced away from the crankcase housing 25 by the spacer section 26, the piston rod 35 must also be of corresponding length. The long length of piston rod so provided offers appreciable resistance to the transmission of heat through the piston rod 35. The piston 13 is provided with an axially extending opening 36 into which one end of the piston rod 35 extends. The end of the piston rod 35 which projects into the piston 13 is spherically shaped, and a block 37 of plastic insulating material is positioned between the end of the piston rod 35 and the bottom of the opening 36 to further reduce heat transfer through the piston rod 35 into the piston 13. The piston rod is necked down adjacent the outer end of the piston 13 to provide an outwardly facing shoulder 38. A split annular retaining ring 39 is positioned against the shoulder 38 and is secured to the end of the piston 13 by means of machine screws 40, only one of which is shown. The opposite end of the piston rod is fastened to the crosshead 15 in a similar manner by means of a block of insulating material positioned between the crosshead and piston rod to reduce heat flow from the crankcase into the piston rod. Inasmuch as piston 13 and cylinder barrel 11 are maintained substantially at the low temperature of the expanded gases, no lubricant can be used between the piston and cylinder barrel. The unlubricated piston is provided with a series of bronze filled Teflon piston rings 41 to seal the piston with respect to the sidewalls of the cylinder chamber 18, and a pair of bronze filled Teflon bands 42 are provided at opposite ends of the piston for guiding purposes.

Reciprocation of the piston 13 produces reciprocation of the crosshead 15, and movement of the crankshaft. If the crankshaft is loaded, energy is extracted from the system by the load. To cause movement of the piston 13, inlet gases under high pressure are admitted to the portion of the cylinder chamber above the piston 13 through an inlet passage 43 from another inlet passage 44 both of which are located in the head 12. An annular valve seat 45 is provided between the inlet passage 43 and the inlet 44, and flow communication therebetween is controlled by an outwardly opening inlet poppet valve 46. The valve 46 has a valve stem 47 received in a tubular valve guide 48 which extends through the cylinder head 12, and the heavy block of insulation 32 to the rocker box 17 where the valve stem 47 is reciprocated by conventional valve actuating structure. High pressure inlet gases are conducted to the inlet passage 44 through a suitable inlet connection 49 that is bolted to the cylinder head 12 using a conventional lens ring type gasket 50.

After the energy has been extracted from the gas charge, the expanded gases are discharged from the cylinder chamber 18 through an L-shaped discharge passage 51 in the head 12 to a surge chamber connection 52 that is bolted to the side of the head 12. An annular exhaust valve seat 53 is pressed into the sides of the discharge passage 51, and flow therethrough is controlled by a poppet type discharge valve 54. A valve stem 55 and guide barrel 56 for the exhaust valve extend through the head 12 and insulation block 32 to the rocker box 17 where the valve stem is actuated by conventional valve actuating structure.

In the preferred embodiment shown in the drawing, the surge chamber connection 52 is made part of an annular surge chamber 57 which closely surrounds the cylinder housing 22 and cylinder head 12. An annular block of balsa wood or similar insulation 58 is positioned radially outwardly of the plastic insulation 32 between the surge tank 57 and the end plate 33, and the surge tank is further insulated by an annular vacuum radiation shield 59 which extends between the end plate 33 and the end of the spacer section 26 adjacent the crankcase housing 25. In the preferred form, the radiation shield comprises annular inner and outer sleeves 60 and 61 which are welded together adjacent the end plate 33, and which are welded at their other end to an annular ring 62 which slides over the spacer section 26. A pair of O-rings 63 are provided in the spacer section 26 beneath the annular ring 62 to provide a gas-tight seal. The opposite end of the inner sleeve 60 is welded to an annular ring 64 which in turn is bolted to the end plate 33. The space between the inner and outer sleeves 60 and 61 is a shield comprising multiple layers of aluminum foil with all inter-layer gases removed so that a most effective radiation shield is provided. It will be seen that the construction above described effectively insulates the cylinder head 12, cylinder housing 22, spacer section 26, and the surge chamber 57 with a single radiation shield.

The end of the crankcase housing 25 adjacent the spacer section 26 is closed off by a partition 65 having a conventional oil seal 66 which surrounds the piston rod 35. The partition 65, annular spacer section 26, and flange 23 of the cylinder housing 22 form an enclosure around the piston rod end of the cylinder chamber which prevents convective heat losses to the outside of the machine.

A certain amount of gas will always escape past the piston rings 41, and these gases are called "piston blow-by gases." These gases are, of course, extremely cold and create a considerable amount of turbulence as they escape from around the piston. According to the invention, a partition 67 is provided to hold the cold "blow-by" gases around the cylinder housing 22 and prevent their turbulent from stirring up the warmer gases in the rest of the enclosure previously described. The outer edge of the partition 67 is preferably clamped between the flange 23 of the cylinder housing 22 and the annular ring of insulation 28 to impede the flow of heat from the spacer 26 into the partition 67. The partition 67 also includes a conventional piston rod packing 68 to prevent the escape of blow-by gases around the piston rod. The packing 68 is spaced from the oil seal 66 by a distance greater than the stroke of the piston 13, so that the portion of the piston rod 35 which passes through the oil seal 66 does not also pass through the packing 68.

To aid in additionally reducing convective currents within the above-referred-to enclosed chamber, the disc of insulation 29 is caused to extend completely across the end of the crankcase housing and closely engage the piston rod 35 to form another partition. As previously indicated, frost has collected on the piston rods of prior art expansion engines to the extent that it has interfered with the oil seal at the crankcase. This problem has been eliminated in the present invention by the provision of a radiation shield 69 which surrounds the piston rod at the oil seal to reflect heat back into the portion of the rod that reciprocates through the oil seal. The radiation shield 69 is formed by an annular boss 70 of insulating material which extends from the disc 29 into engagement with the structure which forms the partition 65 to hold warm gases around the rod. The boss 70 is lined with several layers of reflective shielding 71 to reflect heat back into the rod.

As a final measure for reducing heat flow into the cylinder housing 22 from the crankcase housing 25, the "blow-by gases" from the area between the partition 67 and flange 23 are conducted through passages 72 which extend through the partition 67, ring 28, spacer 26 and insulator disc 29 to the area between the disc 29 and partion 65. The gases pick up heat from the spacer section 26, and then flow into the annular space between the disc 29, crankcase housing 25 and boss 69 to extract further heat from the crankcase housing. The exit gases then flow through an outlet connection 73 in the crankcase housing 25 from whence they are conducted back into the inlet of the refrigeration cycle.

As previously indicated, prior art expansion engines have timed the exhaust valve closure at late as possible on the exhaust stroke of the piston, in order to discharge substantially all of the expanded gases. These prior art engines have closed the exhaust valve just in time to avoid valve overlap with the intake valve. According to the present invention, however, it has been found that although the quantity of gas that is discharged is reduced by closing the exhaust valve early to partially compress the gases at the end of the discharge stroke, the thermal efficiency of the engine is actually increased. This occurs by reason of the fact that partial recompression diminishes the constant enthalpy throttling of the gases that occurs when the high pressure gases are throttled through the inlet valve. It has been found that an optimum thermal efficiency of the machine is produced if the exhaust valve is closed at a time when approximately one-quarter to one-third of its stroke remains so that the gases are recompressed to about one-third to one-half of their inlet pressure. Where the expansion engine is used to liquefy air or nitrogen for example, optimum results are achieved by opening the intake valve 14° before top center, closing the inlet valve 65° after top center, opening the exhaust valve 15° before bottom center, and closing the exhaust valve 51° before top center. In addition to improving the thermal efficiency of the engine, recompression reduces the forces involved in opening the inlet valve so that inlet valve life is prolonged.

It will be apparent that the objects heretofore enumerated as well as others have been accomplished and that there has been provided a cryogenic expansion engine which differs from the prior art in many respects and has an efficiency in excess of 80% while the efficiency of prior art expansion engines has been generally below 75%. The engine described operates on an improved cycle which uitilizes recompression at the end of its discharge stroke; it maintains its cylinder at the temperature of the discharge gases and effectively insulates the same from the crankcase and valve rocker structure; it utilizes piston "blow-by gases" to remove heat from the spacer and crankcase section; it insulates the cylinder housing and exhaust surge chamber by a single structure; and it keeps the piston rod warm adjacent the oil seal.

While the invention has been described in considerable detail, we do not wish to be limited to the particular embodiment shown and described; and it is our intention to cover hereby all novel adaptations, modifications and arrangements thereof which come within the practice of those skilled in the art to which the invention relates.

What we claim is:

1. In a cryogenic expansion engine: a housing having a closed cylinder chamber therein, a piston in said cylinder chamber and cooperating with said cylinder chamber to provide an expansion chamber, means operated by said piston for performing work, and thus extracting energy from gases expanded in said expansion chamber, said housing having inlet and exhaust passages communicating with said expansion chamber, inlet and exhaust valve structures for controlling fluid flow through said inlet and exhaust passages respectively, said piston moving from a position adjacent said closed end of said cylinder chamber to a retracted position spaced from said closed end during an expansion stroke, and moving from said retracted position to said position adjacent said closed end of said cylinder chamber during a return stroke of said piston, means for opening said inlet valve at a beginning portion of an expansion stroke, and means opening said exhaust valve at approximately the beginning of an exhaust stroke and closing said exhaust valve while at least approximately one-quarter to one-third of the return stroke of said piston remains to partially recompress the gases in said expansion chamber.

2. In a cryogenic expansion engine: a housing having a closed cylinder chamber therein, a piston in said cylinder chamber and cooperating with said cylinder chamber to provide an expansion chamber, means operated by said piston for performing work and thus extracting energy from gases expanded in said expansion chamber, said housing having inlet and exhaust passages communicating with said expansion chamber, inlet and exhaust valve structures for controlling fluid flow through said inlet and exhaust passages respectively, said piston moving from a position adjacent said closed end of said cylinder chamber to a retracted position spaced from said closed end during an expansion stroke and moving from said retracted position to said position adjacent said closed end of said cylinder chamber during a return stroke of said piston, means for opening said inlet valve at a beginning portion of an expansion stroke, and means opening said exhaust valve at approximately the beginning of an exhaust stroke and closing said exhaust valve before said piston reaches the end of its return stroke to recompress the gases in said expansion chamber to approximately one-third to one-half of the inlet pressure before said inlet valve is reopened to admit gas to said expansion chamber for the next expansion stroke.

3. A cryogenic expansion engine comprising: a crankcase having a cross head therein mounted for reciprocatory movement of predetermined stroke, a cylinder housing having a cylinder chamber therein in line with said cross head, a piston in said cylinder chamber, a piston rod connecting said piston to said cross head, a partition closing off said crankcase and containing an oil seal which slidably receives said piston rod, said cylinder housing being spaced from said oil seal by a distance at least equal to said predetermined stroke, a heat insulating section positioned between said crankcase and said cylinder housing, a cylinder head on the end of said cylinder housing opposite from said crankcase, a block of substantially non-compressible insulating material on the opposite side of said cylinder head from said cylinder housing, a valve rocker box positioned against the opposite side of said insulating material from said cylinder head, valve actuating means extending from said valve rocker box through said insulating material into said cylinder head for regulating fluid flow into and out of said cylinder chamber, and whereby said cylinder housing and cylinder head are maintained at cryogenic temperatures while said crankcase and valve rocker box are maintained at approximately ambient temperatures.

4. The cryogenic expansion engine of claim 3 wherein said cylinder head and valve rocker box are held in position by rods which extend from said valve rocker box through said block of insulation, and cylinder head into said cylinder housing to clamp the same in assembled relationship onto said cylinder housing.

5. The expansion engine of claim 3 wherein a partition is provided between said cylinder housing and said partition closing closing off said crankcase, said partition including a sliding seal around said piston rod and forming an enclosed chamber which confines the piston blow-by gases to the area adjacent said cylinder housing.

6. The expansion engine of claim 5 wherein said heat insulating section includes a generally cylindrical metallic enclosure which spaces said cylinder housing from said crankcase, and means are provided for conducting gases from said enclosed chamber adjacent said cylinder housing along the walls of said cylindrical metallic enclosure to cool said enclosure.

7. The expansion engine of claim 5 wherein said sliding seals of said partitions are spaced apart by a distance greater than said predetermined stroke of said cross head.

8. The cryogenic expansion engine of claim 6 wherein a generally cylindrically shaped radiation shield extends from said valve rocker box to said crankcase to enclose said cylinder head, cylinder housing, and said cylindrical metallic enclosure, and an annular discharge chamber is provided around said cylinder head and within said radiation shield to smooth out the flow of fluid discharged from the expansion engine.

9. The expansion engine of claim 7 wherein a radiation shield is provided on said cylinder housing side of said sliding seal of said partition closing off said crankcase, said radiation shield being constructed and arranged to hold sufficient heat in said piston rod to prevent frost from collecting on the portion of said piston rod which reciprocates through said sliding seal.

10. In a cryogenic expansion engine: a crankcase having a cross head therein mounted for reciprocatory movement of predetermined stroke, a cylinder housing having a cylinder chamber therein in line with said cross head, a piston in said cylinder chamber, a piston rod connecting said piston to said cross head, a first partition closing off said crankcase and containing an oil seal which slidably receives said piston rod, a support positioned between said cylinder housing and said crankcase, and a second partition positioned between said first partition and said cylinder housing, said second partition having a sliding seal with respect to said piston rod and confining piston blow-by gases to the region adjacent said cylinder housing.

11. In a cryogenic expansion engine: a crankcase having a cross head therein mounted for reciprocatory movement of predetermined stroke, a cylinder housing having a cylinder chamber therein in line with said cross head, a piston in said cylinder chamber, a piston rod connecting said piston to said cross head, a first partition closing off said crankcase and containing an oil seal which slidably receives said piston rod, an enclosure positioned between said cylinder housing and said crankcase, and a second partition positioned in said enclosure between said first partition and said cylinder housing, said second partition having a sliding seal with respect to said piston rod and confining piston blow-by gases to the region adjacent said cylinder housing.

12. The combination of structure specified in claim 11 wherein: said second partition cooperates with said enclosure to provide a cold gas chamber which surrounds at least a portion of said cylinder housing, and said enclosure includes a generally cylindrical metallic spacer section which spaces said cylinder housing from said crankcase, said combination including fluid flow conducting means for conducting fluid out of said cold gas chamber past said spacer section to cool said spacer section.

13. The combination of structure of claim 10 wherein: a first plastic insulating disc is positioned between said crankcase and said support section, and a second plastic insulating disc is positioned between said support section and said cylinder housing, and said second partition connects with said enclosure between said second plastic insulating disc and said cylinder housing.

14. The combination of structure of claim 10 wherein said seals of said first and second partitions are spaced apart by a distance greater than said predetermined stroke.

15. In a cryogenic expansion engine: a crankcase having a cross head therein mounted for reciprocatory movement of predetermined stroke, a cylinder housing having a cylinder chamber therein in line with said cross head, a piston in said cylinder chamber, a piston rod connecting said piston to said cross head, a partition closing off said crankcase and containing an oil seal which slidably receives said piston rod, an enclosure positioned between said cylinder housing and said crankcase, and a radiation shield in said enclosure surrounding said piston rod adjacent said oil seal, whereby the portion of said piston rod which reciprocates through said oil seal is kept warm enough to prevent frost from collecting on the portion of said rod which passes through said oil seal.

16. In a cryogenic expansion engine: a crankcase having a cross head therein mounted for reciprocatory movement of predetermined stroke, a cylinder housing having a cylinder chamber therein in line with said cross head, a piston in said cylinder chamber, a piston rod connecting said piston to said cross head, a partition closing off said crankcase and containing an oil seal which slidably receives said piston rod, an enclosure positioned between said cylinder housing and said crankcase, a plastic heat insulating member positioned between said crankcase and said enclosure, said heat insulating member closely surrounding said piston rod and serving to prevent convection flow of cold gases within said enclosure from contacting said crankcase, and a boss projecting from said heat insulating member into contact with said crankcase and surrounding said piston rod, said boss shielding the portion of said rod which passes through said oil seal from cold gases in said enclosure.

17. The combination of structure of claim 16 wherein said boss includes heat reflective surfaces for reflecting heat back into the portion of said piston rod which passes through said oil seal.

18. In a cryogenic expansion engine: a crankcase having a cross head therein mounted for reciprocatory movement of predetermined stroke, a cylinder housing having a cylinder chamber therein in line with said cross head, a piston in said cylinder chamber, a piston rod connecting said piston to said cross head, a partition closing off said crankcase and containing an oil seal which slidably receives said piston rod, a support structure spacing said cylinder housing from said crankcase, a surge tank generally wrapped around said cylinder housing for receiving discharge gases from said cylinder chamber, and a single generally cylindrical radiation shield surrounding said surge tank, cylinder housing, and support structure.

19. The structure as recited in claim 18 wherein said radiation shield is fixed relative to said cylinder housing at its end opposite said crankcase, and a sliding seal is provided between the other end of said radiation shield and said support structure, said sliding seal comprising surfaces on said radiation shield and support which slide relative to each other, and an "O-ring" mounted in one of said surfaces for sealing contact with the other of said surfaces.

20. A cryogenic expansion engine comprising: a crankcase having a cross head therein mounted for reciprocatory movement of predetermined stroke, a cylinder housing having a cylinder chamber therein in line with said cross head with a closed end spaced away from said cross head and an open end toward said cross head, a piston in said cylinder chamber, said piston moving from a position adjacent the closed end of said cylinder chamber to a retracted position spaced toward the open end during an expansion stroke and moving from said retracted position to said position adjacent said closed end of said cylinder chamber during a return stroke of said piston, a piston rod connecting said piston to said cross head, a partition closing off said crankcase and containing an oil seal which slidably receives said piston rod, said cylinder chamber having cylinder walls spaced from said oil seal by a distance at least equal to said predetermined stroke, heat insulating section positioned between said crankcase and said cylinder housing, a cylinder head at the closed end of said cylinder housing opposite said crankcase, a block of substantially non-compressible insulating material on the opposite end of said cylinder head from said cylinder housing, a valve rocker box positioned against the opposite side of said insulation material from said cylinder head, inlet and exhaust valve structures in said head and having stem portions extending through said insulating material and into said valve rocker box for regulating fluid flow into and out of said cylinder chamber, and means opening said exhaust valve at approximately the beginning of an exhaust stroke and closing said exhaust valve before said piston reaches the end of its return stroke to recompress the gases in said expansion chamber to approximately one-third to one-half of the inlet pressure before said inlet valve is reopened to admit gas to said expansion chamber for the next expansion stroke, and whereby said cylinder housing and cylinder head are maintained at cryogenic temperatures while said crankcase and valve rocker box are maintained at approximately ambient temperatures.

References Cited by the Examiner

UNITED STATES PATENTS

| | | | |
|---|---|---|---|
| 594,283 | 11/1897 | Reeder | 60—64 |
| 1,293,713 | 2/1919 | Chuse | 60—64 |
| 1,516,894 | 11/1924 | Stevenson | 91—272 |
| 2,247,802 | 7/1941 | Damerell | 60—64 |
| 2,608,955 | 9/1952 | Hoy | 91—272 |

MARTIN P. SCHWADRON, *Primary Examiner.*

ROBERT R. BUNEVICH, EDGAR W. GEOGHEGAN,
*Examiners.*